United States Patent [19]

Meier et al.

[11] 4,173,512

[45] Nov. 6, 1979

[54] SHOCK ABSORBER SYSTEM FOR NUCLEAR REACTOR ICE CONDENSER COMPARTMENT

[75] Inventors: Joseph F. Meier, Export; George E. Rudd, Murrysville, both of Pa.; Ashok V. Pradhan, Beechwood, Ohio; John A. George, Greensburg, Pa.; Hugh W. Lippincott, Pittsburgh, Pa.; John D. Sutherland, Monroeville, Pa.

[73] Assignee: Westinghouse Electric Corp., Pittsburgh, Pa.

[21] Appl. No.: 459,450

[22] Filed: Apr. 9, 1974

[51] Int. Cl.² ............................................. G21C 13/10
[52] U.S. Cl. ................................... 176/37; 16/86 A
[58] Field of Search ................. 176/37, 38; 16/86 A; 188/1 C

[56] References Cited

U.S. PATENT DOCUMENTS

| 3,115,450 | 12/1963 | Schanz | 176/37 |
|---|---|---|---|
| 3,120,022 | 2/1964 | Germann | 16/86 A |
| 3,248,298 | 4/1966 | Norman | 176/37 |
| 3,305,452 | 2/1967 | Remoleur | 188/1 C X |
| 3,410,511 | 11/1968 | Coppa | 188/1 C X |
| 3,580,806 | 5/1971 | Weems et al. | 176/37 |
| 3,726,759 | 4/1973 | Taft et al. | 176/37 |
| 3,784,182 | 1/1974 | Sobel | 188/1 C X |
| 3,796,286 | 3/1974 | Kraupa | 188/1 C |
| 3,844,885 | 10/1974 | Weems et al. | 176/37 |
| 3,888,531 | 6/1975 | Straza et al. | 188/1 C X |

Primary Examiner—Peter A. Nelson
Attorney, Agent, or Firm—J. R. Campbell; Z. L. Dermer

[57] ABSTRACT

A shock absorber system was designed to absorb the energy imparted to doors in a nuclear reactor ice condenser compartment as they swing rapidly to an open position. Each shock absorber which is installed on a wall adjacent each door is large and must absorb up to about 40,000 foot pounds of energy. The basic shock absorber component comprises foam enclosed in a synthetic fabric bag having a volume about twice the foam volume. A stainless steel knitted mesh bag of the same volume as the fabric bag, contains the fabric bag and its enclosed foam. To protect the foam and bags during construction activities at the reactor site and from the shearing action of the doors, a protective sheet metal cover is installed over the shock absorber ends and the surface to be contacted by the moving door. With the above shock absorber mounted on a wall behind each door, as the door is forcibly opened by steam pressure and air resulting from a pipe break in the reactor compartment, it swings at a high velocity into contact with the shock absorber, crushes the foam and forces it into the fabric bag excess material thus containing the foam fragmented particles, and minimizes build-up of pressure in the bag as a result of the applied compressive force.

6 Claims, 9 Drawing Figures

SHOCK ABSORBER SYSTEM FOR NUCLEAR REACTOR ICE CONDENSER COMPARTMENT

BACKGROUND OF THE INVENTION

The invention described herein relates to shock absorbers for hinged doors and more particularly to a shock absorber system for ice condenser doors in a nuclear reactor power plant.

The major components of a nuclear reactor power plant including the reactor, pumps, steam generators and connecting piping are located in a concrete containment structure. Coolant circulated through the reactor by the pumps absorbs heat from the fission process and as this heated coolant is passed through the steam generators, the heat is transferred to a secondary circuit which then provides steam for driving a turbo-generator which generates electric power. During the course of circulating such coolant into heat exchange relationship with the reactor fuel elements, gases and particles in the coolant may become radioactive and cannot be permitted to escape to the atmosphere. It therefore is apparent that in the unlikely event of rupture of the coolant piping, the released coolant flashes into steam and the released radioactive particles must be contained in the reactor containment. To accommodate the consequent rise in pressure inside the reactor containment and to prevent such escape of radioactive particles to the atmosphere, one well known method includes condensing the steam by passing it over ice located in a compartment positioned around the inside walls of the reactor containment.

Patent application Ser. No. 435,903 filed Dec. 23, 1973 by S. J. Weems et al entitled "Nuclear Reactor Condenser Door Arrangement", assigned to same assignee as the present invention, discloses different designs and features of an ice condenser compartment used for this purpose. As shown and described therein, doors are located in the bottom and at the top of the ice condenser compartment. Should a steam break occur, such as complete rupture of the largest coolant pipe, steam released by the coolant generates a pressure which opens the bottom doors thus permitting steam including radioactive particles to enter the compartment and condense on the ice located therein. After the initial pressure surge, the doors must be capable of returning to a normally closed position without being warped or otherwise bent in order to continue performing their flow metering function of regulating and proportioning the long term steam boil-off due to decay heat.

Present designs of doors which conventionally measure 84–92 inches high, 42 inches wide, and 8 inches thick will generate about 30,000 to 50,000 foot pounds of energy when the surface of a door facing the reactor compartment is exposed to a pressure of about 12 psi. This pressure is sufficient to open the doors at a high velocity and an important reason for absorbing the door energy with a shock absorber that limits the forces is that otherwise the forces imposed by the swinging door on the ice condenser compartment door frames and the adjacent wall may well damage the structural components sufficiently as to require extensive repairs to the structure.

SUMMARY OF THE INVENTION

Briefly stated, a crushable shock absorber is provided which is mounted inside an ice condenser compartment associated with a nuclear reactor. Doors in the condenser compartment walls are forced to an open position and against the shock absorber by steam pressure in the reactor compartment. The shock absorber impact surface is of a size substantially the same as one side of the door and is designed with rigid-brittle characteristics to help assure absorption of energy without rebound and without damaging the door, door frames and supporting structure. Provision is made to contain the rigid-brittle foam material as it is fractured by the impacting forces to thus eliminate any possibility of such material entering the reactor cooling system.

It therefore is an object of the invention to provide a shock absorber for a hinged door in an ice condenser for a nuclear reactor which will absorb impact forces imposed on the shock absorber when the door swings toward an open position.

Another object of the invention is to provide a shock absorber for a hinged door in an ice condenser compartment containing a material having rigid-brittle characteristics which fragments when subjected to door impacting forces and is retained in an enclosing bag after fragmentation.

Another object of the invention is to provide a shock absorber for a hinged door in an ice condenser compartment which minimizes rebound of the door after door impacting action takes place.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings wherein:

DESCRIPTION OF THE PREFERRED EMBODIMENT

Figure 1:
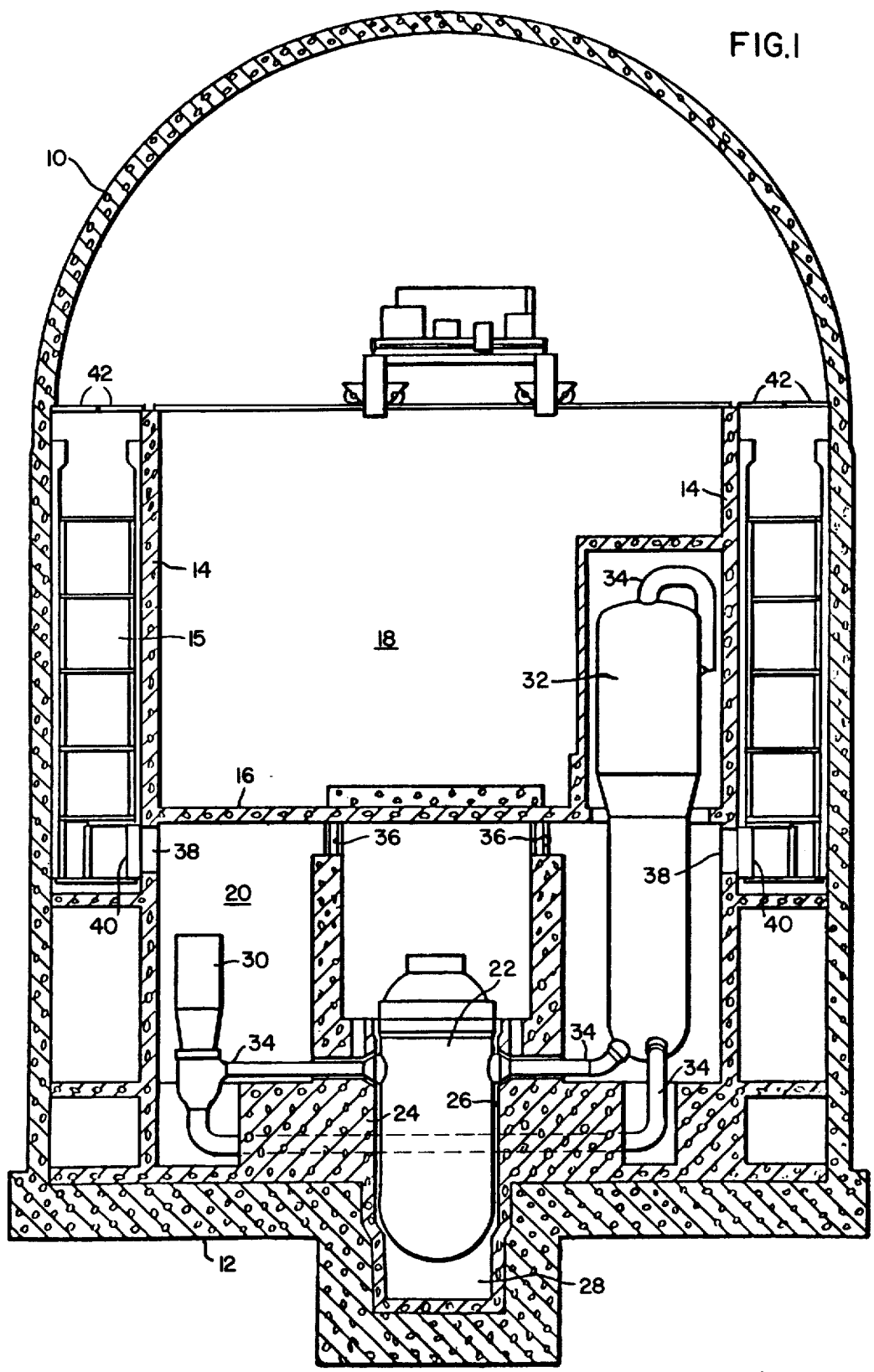
FIG. 1 illustrates the general arrangement of components in a nuclear reactor system and an ice condenser compartment mounted on the side walls of a concrete containment wall.

Referring now to the drawings wherein like reference characters designate like or corresponding parts throughout the several views, there is shown in FIG. 1 a nuclear reactor and its associated components located inside a wall which encloses an ice condenser compartment. The primary function of the ice condenser is to absorb energy released by the reactor coolant in the event a major rupture occurs in the coolant piping. The typical design shown includes a dome-like concrete containment wall 10 supported on base 12. A cylindrical wall 14 extends around the inside of the containment area for about 300° and the area between the cylindrical wall 14 and the concrete containment wall 10 defines an ice condenser compartment 15. A floor 16 divides the containment into upper and lower reactor compartments 18 and 20. The nuclear reactor 22 generally shown is spaced from a concrete enclosure 24 by a gap 26 and a sump 28 below the reactor serves to contain water which may escape from a ruptured pipe, and melted ice from the condenser compartment 15. Conventionally, pumps 30 circulate coolant through the reactor to a steam generator 32 via piping 34 in a primary closed loop. Heat imparted to the coolant by the fission process taking place in the reactor, is transferred in the steam generator to a secondary circuit which provides steam for driving turbo-generator apparatus, not shown.

As illustrated in FIG. 1, the enclosed area above the reactor includes vent openings 36 which lead to inlet ports 38 closed by normally closed vertically hinged doors 40 located in the bottom of the ice condenser compartment 15. Horizontally hinged doors 42 at the top of the condenser compartment also are maintained in a normally closed position. In its preferred form, ice in the condenser compartment 15 is contained in cylindrical columns not shown, the arrangement being disclosed in application Ser. No. 820,074 filed Apr. 30, 1969 by W. G. Taft et al and assigned to the Westinghouse Electric Corporation.

The function of the ice condenser is to absorb both radioactive gases and energy released by the coolant should it escape from the closed primary loop connecting the reactor, pumps and steam generators. The coolant is circulated at a relatively high temperature and pressure through the reactor system and in the event a major rupture occurs in piping 34 for example, the released coolant flashes into steam. The sudden increase in pressure in reactor compartment 18 is sufficient to open each of about forty-eight doors 38 located around the inside of the condenser compartment. Should the steam break be massive, the doors are violently forced open and the resulting steam flows into and upwardly through the ice condenser 15 where it condenses on the ice thus decreasing the pressure in the compartment. The melted ice then flows downwardly into the reactor lower compartment 20 and sump 28. Doors 42 at the top of the ice condenser compartment also are moved to an open position thus permitting recirculation of air and water vapor through the reactor compartment and the condenser compartment.

The above discussion of the nuclear reactor-ice condenser system for absorbing energy released by coolant has been made to permit a more complete understanding of the present invention. This invention is directed toward the design of a door shock absorber 44 mounted on the condenser side of each inlet door 40. Each door roughly measures 8 feet high, 3½ feet wide, 8 inches thick and weighs 360 pounds. It is estimated that a major rupture in the reactor piping will generate a sudden pressure of about 12 psi on the door surface. Such pressure is sufficient to force the doors open with a high angular velocity, e.g. 50 radians per second, thus requiring the incorporation of substantial shock absorber and supporting structure in the condenser compartment to absorb the door forces. To accommodate such high forces, e.g. about 40,000 foot pounds of energy, a shock absorber of low density phenolic foam material about the same size as each door, is mounted on the reactor lower support structure and in a position to be contacted by the door as it rapidly moves to an open position.

Figure 3:
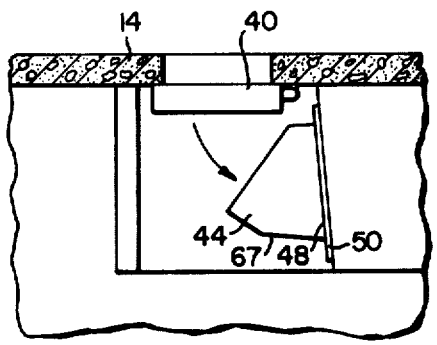
FIG. 3 is a plan view of the structure shown in FIG. 2.
Figure 2:
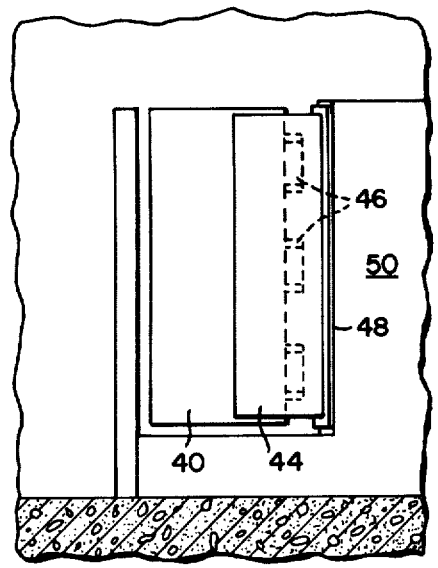
FIG. 2 is a view in elevation of a door and shock absorber arrangement viewed from inside the ice condenser compartment.

Referring to FIGS. 2 and 3, the single door 40 shown is hung on hinges 44 in a conventional manner and is designed to swing inwardly toward the shock absorber 44. The other end of hinges 44 are attached to a wall 50 which projects inwardly into the ice condenser compartment. It is understood that either single or double hung doors may be mounted in each port opening 38 and in the event double hung doors are used, two shock absorber assemblies, one for each door, will be mounted on the lower wall 50 of the ice condenser compartment to permit each door to contact the shock absorber as it swings to an open position. Further, these doors may be returned to a closed position by a light spring in a manner well known in the art. The shock absorber which is described in greater detail later is mounted on a backing plate 48 and the assembly is then bolted or otherwise secured to the wall 50. It measures approximately 42 inches wide, 92 inches high and 29 inches deep.

Although the requirements for the shock absorber may vary depending on the environment of use and impact forces expected to be absorbed, the following design of shock absorber has been chosen to illustrate the preferred embodiment of the invention. The design requirements to be met include a material having less than 50 ppm extractable halides, it must be hydrolytically stable and fire resistant, and capable of absorbing the energy from an impacting door 92 inches high, 42 inches wide, 8 inches thick, weigh 360 pounds and moving at a velocity of 50 radians per second equivalent to about 85 mph at the center of percussion of the door. On impacting, the foam material will crush and must absorb sufficient energy to preclude the impacting door from exceeding its 50 psi crush strength, and must not exert more than 60,000 pounds total force on the lower support structure. Also, it is important that the foam not impart rebound energy to the impacting door. To minimize rebounding, the foam must demonstrate rigid-brittle type characteristics which permits both fragmentation of the foam and substantially total absorption of energy.

Figure 4:
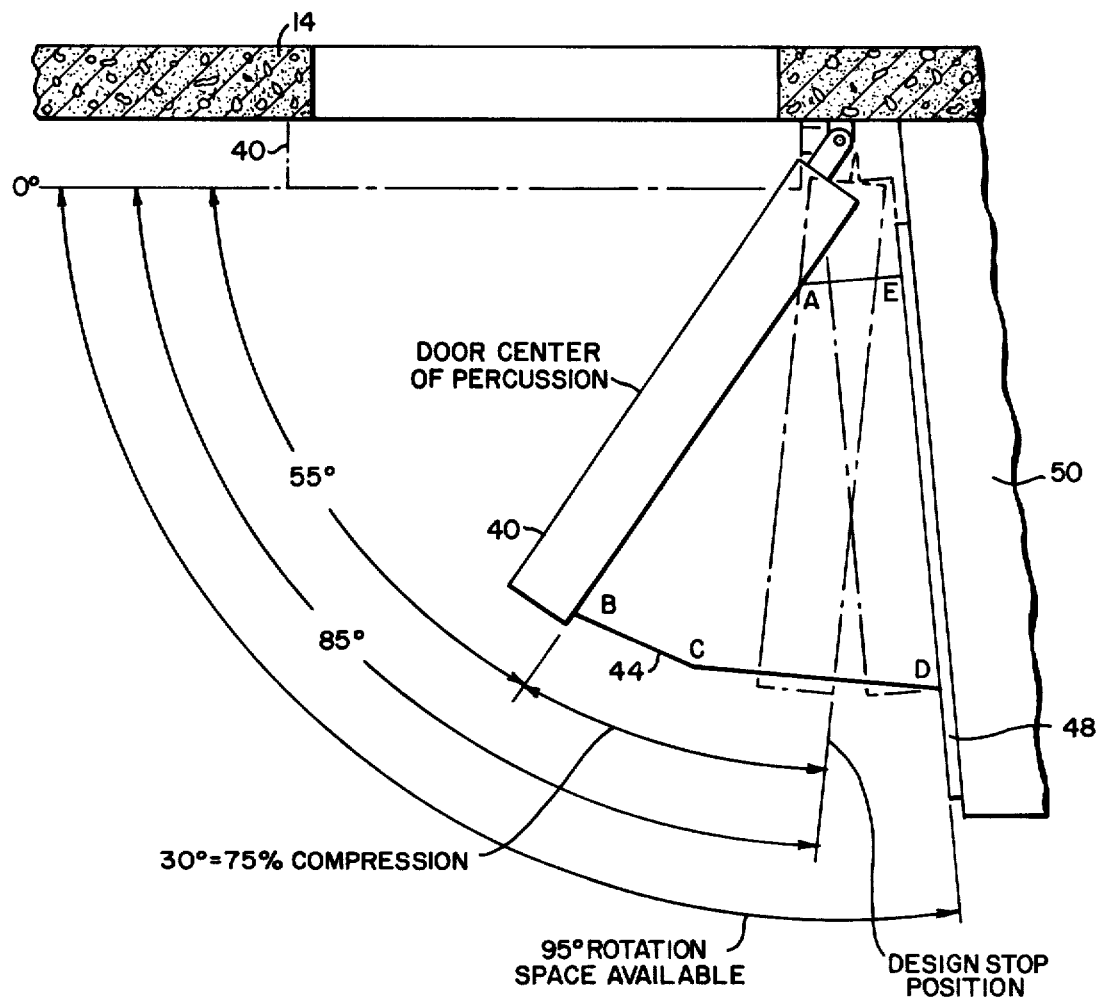
FIG. 4 is a plan view layout of the lower inlet door and shock absorber geometries.

Knowledge of the magnitude of energy expected to be contained in the doors as they swing toward the open position and into the relatively limited space of the reactor support structure, allows a determination to be made of the required energy density for the foam material in the shock absorber. FIG. 4 shows a plan view of the pertinent door and shock absorber geometries. The shock absorber is shown as having a cross-section A, B, C, D, E with the dotted line illustrating door 40 in a closed position, and the full line representation showing the door at just the point of impact with the exposed surface of the shock absorber. Door 40 is permitted to move through 55° of rotation before contacting the exposed surface of the shock absorber. The compressive forces then commence crushing the foam material in shock absorber 44 and as described later, the material fragments and commences to move to the right out of the door impact area. Since 75% compression is a practical maximum deflection that can be achieved before "bottoming-out" occurs, the foam material has been chosen to provide for 85° rotation of the door which is a design stop position. As is apparent from the drawing, the space available for door rotation is 95°, but utilization of the full available space will not be made because the shock absorber is designed to accommodate all foreseeable force magnitudes within 85° door rotation area. The shock absorber having the cross-section shown is 89 inches high and has a volume of 51,000 cubic inches.

Figure 5:
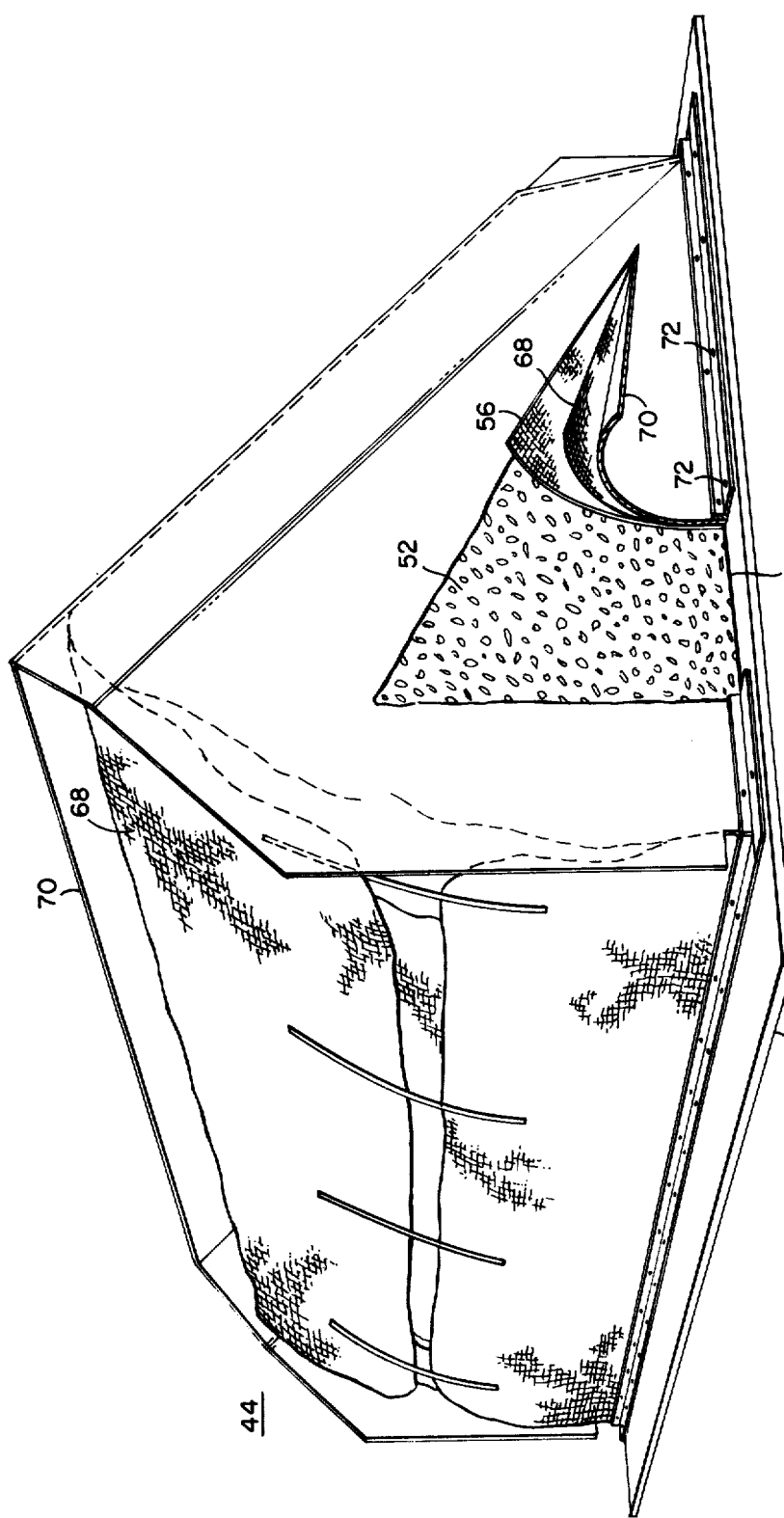
FIG. 5 is an isometric view of the shock absorber assembly before installation in the ice condenser compartment.

FIG. 5 shows the shock absorber assembly 44 in a horizontal position prior to being mounted vertically on condenser compartment wall 50. Parts are broken away to illustrate the various components in the assembly. As indicated above, the main body of the shock absorber comprises phenolic foam 52 bonded to a backing plate 48 of wood, metal or other material. Bonding adhesive 54, such as Scotchgrip 2246 and 3M-34 manufactured by the 3M Company, are particularly effective for this purpose.

Figure 6:
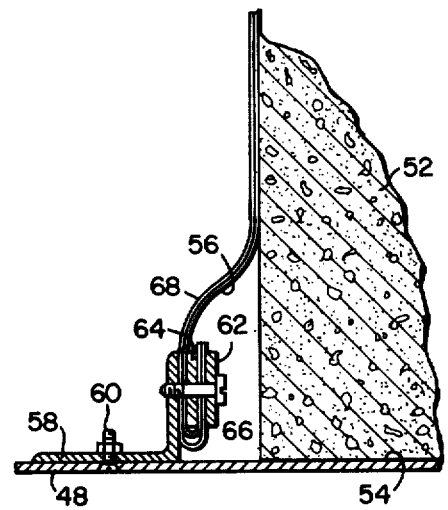
FIG. 6 is a view of the bracket arrangement used for attaching edges of bags covering the shock absorber to a backing plate.

As the door is forced open into impacting relationship with the shock absorber assembly, the compressive forces crush and fragment the phenolic foam. Since it is necessary to contain the fragmented particles, a fabric containment bag 56 of nylon reinforced polyethylene encloses and contains the foam material after impact and therefore precludes their escape into the reactor containment areas. As shown in FIG. 6, the edges of the bag 56 are securely fastened to an angle iron bracket 58 attached to backing plate 48 by bolts 60. The fabric material is locked in place by a pair of plates 62 and 64 bolted to the angle iron, the arrangement being such that the fabric makes a reverse bend around the plate so that upon tightening bolts 66 the fabric becomes held in an inescapable position.

Figure 7:
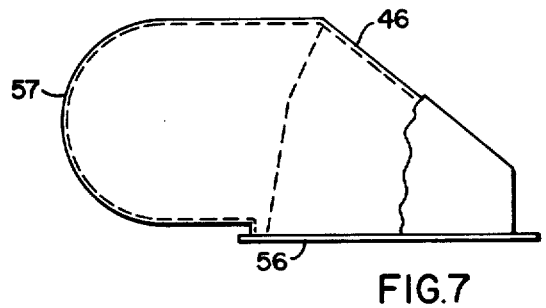
FIG. 7 is a plan view of a foam containment bag and particularly illustrating the amount of excess material incorporated in the bag.

The geometry of the bag is chosen such that it permits the shock absorber to crush without building up a pressure inside the bag. This is accomplished by manufacturing the bag to a size about double that of the volume of foam material. FIG. 7 graphically shows the bag excess material 57 in relation to the phenolic foam. After the bag is installed over the foam, the excess bag material 57 is folded or lapped against the foam surface 67. FIG. 3, which is adjacent the side which receives the impact forces. Therefore, when the foam crushes and fragments, the fragmented particles are forced outwardly into the area of the bag containing the excess material and therefore out from behind the door. This action precludes the establishment of an air pressure inside the bag and further precludes the development of rebound energy which otherwise would act to move the door rapidly back toward a closed position.

Full-scale testing of the shock absorber assembly showed the desirability of providing a backup containment cover 68 for the bag 56 in the event a tear occurred in the fabric bag 56 and to protect the fabric bag from protrusions and sharp edges such as flame cut plates that may exist in the reactor area. The cover 68 is made of knitted stainless steel wire which helps assure containing the foam fragmented particles as they move from the foam original position into the excess material 57 of the fabric bag. The mesh is limp and knitted in an open pattern so as not to interfere with the fabric bag as it unfolds during the foam crushing process. Desirably, the knitted cover is folded with fabric bag excess material against the foam surface. However, it need not be since the steel mesh may remain loose but the design lends itself to storing it in this manner. The free edges of the steel mesh are clamped with the fabric bag edges to the same angle iron, as shown in FIG. 6.

After each shock absorber assembly is installed on walls 50, some construction activities will still take place thus indicating the need to protect the shock absorber from weld splatter, falling tools, and the like. This is accomplished by mounting a stainless steel sheet 70 over the top and bottom surfaces of the shock absorber and the side which is exposed to the impacting forces of a door 40 as it swings to an open position. The ends of steel sheet 70 are attached to the backing plate 48 by screws or other securing means 72. Since the sheet metal cover 70 is relatively thin, being only 26 gauge (0.018 inch) and prebuckled, it does not significantly increase the shock absorber stiffness. In addition, the sheet metal cover preserves the foam geometry during crush which thereby prevents foam shearing. The cover also deforms plastically on impact and holds the crushed shock absorber against the support structure and away from the door opening area.

A desirable characteristic of the phenolic foam material is that it has an essentially open-cell structure which tends to minimize air entrapment. However, the cell size is quite small and to help assure escape of air from the foam material during the crushing process, air escape holes are cored into the foam material to thereby minimize the establishment of localized high pressure areas as the foam fragments.

Figure 9:
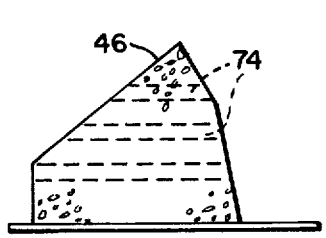
Figure 8:
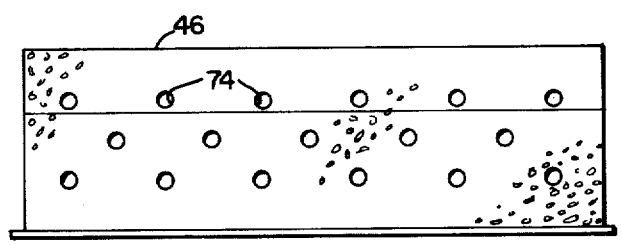
FIG. 8 is a view in elevation of a shock absorber assembly lying in a horizontal position and showing coring hole patterns bored in the phenolic foam shock absorber; and, FIG. 9 is a side view of the shock absorber illustrated in FIG. 8.

FIGS. 8 and 9 illustrate the disposition of coring holes 74 in the shock absorber foam material. The holes are bored in the foam, parallel to one another and extend from the face which is arranged to be contacted by the impacting door towards the back wall. Experimental tests show that a hole structure of 17 holes is most suitable for use with the size of door identified above. The holes were 2.5 inches in diameter which had the effect of removing 3.7% of the volume of foam material. A thirty-four hole pattern has been used, each hole being two inches in diameter which resulted in 4.5% of the volume being removed and this design likewise was effective.

During the course of carrying out performance tests on shock absorber assemblies of the type described above, different bag materials and threads were evaluated and tested. The bag materials included polyethylene reinforced polyethylene film, mylar-nylon cloth laminates and polyethylenefiberglass cloth laminate. The latter was preferred since it processes adequate tensile and tear strengths and has the best radiation resistance. Obviously, other types of materials also could be used for foam containment purposes.

The threads tested included PRD-49 (Kevlar-49) and Fiber B furnished by the DuPont Company, and polypropylene threads made by Threads, Inc. of Minneapolis, Minn.

Numerous impact tests were performed on full-scale prototype shock absorber assemblies, typical results of the tests performed appear in the following summary of data.

In test No. 1, the fabric bag was of nylon-mylar laminated construction and the knitted wire mesh cover was not used.

In all remaining tests, a fiberglass-polyethylene laminate fabric bag was used as was the knitted wire mesh cover described above. A sheet metal protective cover was employed, and in all tests the foam was cored with 17 holes.

TABLE II

Test Data Summary for Full-Scale Impact Tests

| Impact Test No. | Foam Density (lb/ft³) | Chamber Test Pressure (% DBA) | Max. Door Velocity (rad/sec) | Max. Door Rotation (degrees) | Max. Shock Absorber Load (lb)[b] | Shock Absorber Energy (ft-lb) |
|---|---|---|---|---|---|---|
| 1 | 2.6 | 100 | 36.8 | 75 | 36,000 | — |
| 2 | 2.3 | 100 | 35.0 | 75 | 31,700 | 17,400 |
| 3 | 2.1 | 100 | 36.7 | 75 | 48,500 | 26,600 |
| 4[c] | 2.5 | 140 | 38.9 | 79 | 39,000 | 25,000 |
| 5[d] | 2.5 | 100 | 36.7 | 75 | 41,200 | 22,200 |

Notes:
[a]All shock absorbers are Smithers Co. phenolic foam.
[b]Maximum loads are the vector summations of the normal and shear loads.
[c]An 11 ga. steel backup plate was used with this shock absorber, all others used 1.0 inch plywood.
[d]Fabric bag 56 was intentionally slit adjacent to a seam prior to this test.

The different materials used in the performance tests identified above show that many different types of materials may be used in the bag and cover constructions. Likewise, foams of different types such as polyurethane foams and foams having different cellular patterns, may be used. It therefore is apparent that many modifications and variations are possible in light of the above teachings. It is to be understood that within the scope of the appended claims, the invention may be practiced other than as specifically described.

We claim:

1. A shock absorber system for use in an ice condenser compartment for a nuclear reactor comprising:
   a containment enclosing a reactor compartment containing a nuclear reactor having a closed cooling system including piping connecting the reactor, pumps and a steam generator in a closed loop;
   a wall in the reactor compartment spaced from the inner surface of the containment, the space therebetween defining an ice condenser compartment;
   multiple aligned ports located in the bottom of said wall, movable doors mounted in each of said ports, said ports providing access from the reactor compartment to the ice condenser compartment so that in the event of rupture of said piping, coolant released inside the reactor compartment generates a steam pressure which forces said doors under high velocity to an open position thereby providing an avenue for escape of steam into the ice condenser compartment;
   separate crushable shock absorbing means mounted inside the condenser compartment adjacent said ports for absorbing the energy imparted to each door by the steam pressure;
   each of said shock absorber means comprising a member approximately the same size as each of said doors and containing material displaying rigid-brittle type crush behavior which permits fragmentation upon being impacted by said door, and being capable of absorbing the impacting forces of the door without the door rebounding to a closed position; and
   means covering said material for containing the fragmented particles after being impacted by said door, said covering means comprising a fabric containment bag which encompasses said shock absorber material and having an amount of excess fabric of a size sufficiently large to accept at least a major portion of the fragmented material after impacting and to minimize the establishment of an air pressure inside the bag at the time of crushing the fragmented material.

2. A shock absorber system for use in an ice condenser compartment for a nuclear reactor comprising:
   a containment enclosing a reactor compartment containing a nuclear reactor having a closed cooling system including piping connecting the reactor, pumps and a steam generator in a closed loop;
   a wall in the reactor compartment spaced from the inner surface of the containment, the space therebetween defining an ice condenser compartment;
   multiple aligned ports located in the bottom of said wall, movable doors mounted in each of said ports, said ports providing access from the reactor compartment to the ice condenser compartment so that in the event of rupture of said piping, coolant released inside the reactor compartment generates a steam pressure which forces said doors under high velocity to an open position thereby providing an avenue for escape of steam into the ice condenser compartment;
   separate crushable shock absorbing means mounted inside the condenser compartment adjacent said ports for absorbing the energy imparted to each door by the steam pressure;
   each of said shock absorber means comprising a member approximately the same size as each of said doors and containing material displaying rigid-brittle type crush behavior which permits fragmentation upon being impacted by said door, and being capable of absorbing the impacting forces of the door without the door rebounding to a closed position;
   means covering said material for containing the fragmented particles after being impacted by said door, said covering means comprising a fabric containment bag; and
   a mesh bag enclosing said fabric containment bag and of sufficient strength to contain the fragmented material in the event the fabric bag fails during impacting by said door.

3. The shock absorber system according to claim 1 wherein the means covering said shock absorber material comprises a fabric containment bag; and
   the mesh bag enclosing said fabric bag and being sufficiently strong to contain the fragmented material in the event the fabric bag fails during impacting; and
   said mesh bag being of knitted stainless steel wire mesh which is sufficiently flexible and knitted in an open pattern to preclude interference with unfolding of the fabric containment bag during impacting of the door against the shock absorber.

4. The shock absorber system according to claim 1 wherein the shock absorber material comprises a plastic foam of open cell construction.

5. The shock absorber system according to claim 4 wherein the volume of fabic bag covering said material is greater than the volume of the shock absorber foam; and
   before impacting, the excess fabric material is folded back against the foam.

6. The shock absorber system according to claim 4 wherein the top, bottom and surface of the shock absorber against which the door impacts is covered with a sheet metal cover which preserves the foam geometry during crush thereby preventing foam shearing without significantly increasing the shock absorber stiffness.

* * * * *